INVENTORS
Harold J. McCotter
Edward J. DeHoff
BY
D.D. McGraw
Their Attorney 3,246,473
ZERO TRAVEL POWER BRAKE
Harold J. McCotter, Kettering, and Edward J. De Hoff, Dayton, Ohio, assignors to General Motors Corporation, Detroit, Mich., a corporation of Delaware
Filed Oct. 24, 1963, Ser. No. 318,720
7 Claims. (Cl. 60—54.6)

This invention relates to a motor vehicle power braking system and more particularly to a type of power brake requiring very little travel for powered operation and which has means for raising the brake pedal to gain a greater mechanical advantage for low powered or unpowered operation.

It is an object of the present invention to provide a device which will change the mechanical advantage of a brake pedal used in a power braking system when the brakes are to be operated mechanically upon power failure.

It is another object of the present invention to provide a device which will vary the mechanical advantage of a brake pedal normally used in a power braking system as the available pressure for powered operation diminishes.

It is still another object of the present invention to provide a device, integral with a power braking unit, that will change the pedal position relative to a toe board as the pressure available to such a power braking system varies.

It is yet another object of the present invention to provide a servomotor that is circumferentially mounted on a conventional power braking unit for moving said unit, in its entirety, so as to vary the height of a brake pedal in a driving compartment as the pressure availability to the power braking unit changes.

Further objects and advantages of the present invention will be apparent from the following description, reference being had to the accompanying drawings wherein a preferred embodiment of the present invention is clearly shown.

Figure 1:
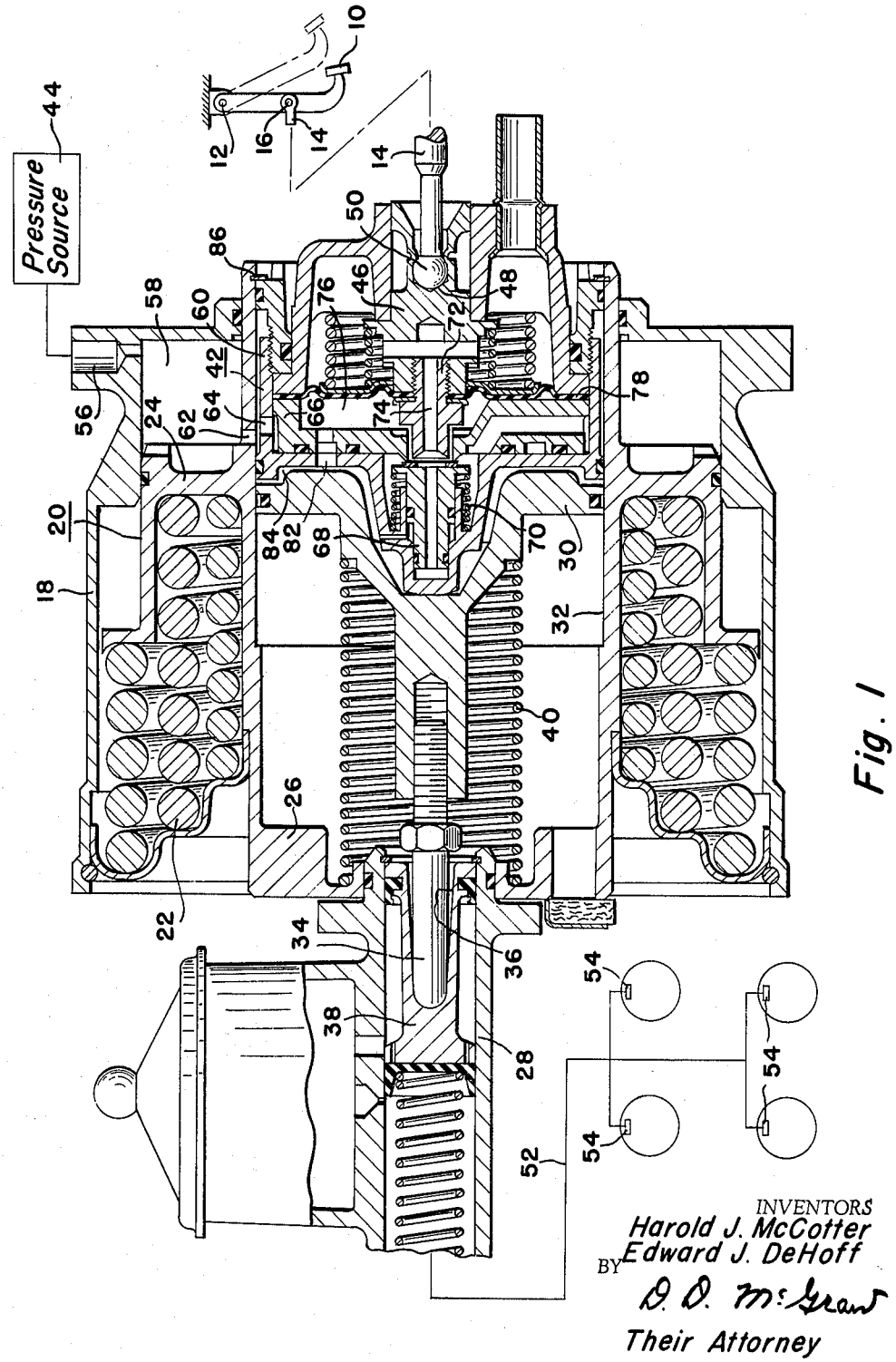
FIGURE 1 is a sectional view of a power braking unit constructed according to the present invention in which the configuration that the power system would assume during powered operation is illustrated.

Referring now to FIGURE 1, a brake pedal 10 is shown pendantly supported from any appropriate point inside the operator's compartment of a motor vehicle. The brake pedal 10 is pivoted at point 12 and cooperates with a push rod 14 that is pivotally attached to the brake pedal at point 16. This pivotal mounting allows free cooperation between the brake pedal and the push rod as the pedal angle varies around the pivot 12 during operation of the brakes.

A housing 18 slidably supports a servomotor, generally designated by the numeral 20. The servomotor 20 is biased to the right, as viewed in FIGURE 1, by a spring pack 22. The servomotor 20 includes a pressure piston portion 24 and a power cylinder portion 26. A hydraulic master cylinder 28 is mounted on the power cylinder 26 in any well-known fashion and, therefore, moves with the power cylinder during its operation. A power piston 30 is disposed for sliding movement within a bore 32 of the power cylinder 26. The power piston 30 has a drive pin 34 disposed in a pocket 36 of a piston 38 arranged to displace hydraulic fluid from the hydraulic master cylinder 28. A return spring 40 serves to bias the power piston 30 away from the piston 38. A power output control means, generally designated by the numeral 42, serves to meter pressure from a pressure source 44 to the power side of the power piston 30. The power output control means has a driving slide 46 which includes a pocket 48 that engages a ball 50 on the push rod 14 during operation. The hydraulic master cylinder 28 is connected through a line 52 to a series of wheel cylinders 54 which are responsive to hydraulic pressure for the actuation of the motor vehicle brakes.

In operation, air pressure from the supply source 44 is connected to an opening port 56 as shown in FIGURE 1 and delivered to a chamber 58 which compresses the springs 22 and moves the entire power cylinder 26 to the forward position or to the left as viewed in FIGURE 1. This carries the pedal 10 to the low position and the hydraulic master cylinder 28 also moves to the forward position. Air at the full line pressure is ported through a valve body 60 through ports 62 and 64 to the outer edge of an air valve 66.

An exhaust valve 68 having a flat face is held against the sealing edge of the air valve 66 by means of a spring 70. This is the condition when at rest. All other areas are at atmospheric pressure.

When force is applied at the push rod 14 sufficient to overcome the spring 70, the modulating valve 72 is moved into contact with the face of the exhaust valve 68. This closes off an exhaust passage 74 through the center of the modulating valve 72.

When an additional amount of force is applied to the push rod 14 sufficient to overcome the spring 70, air pressure is admitted to a chamber 76. The air pressure in the chamber 76 exerts a force on a diaphragm 78 which in turn produces a reaction force on the push rod 14. In this way, the modulated air pressure in the chamber 76 is governed by the force on the push rod 14.

Modulated air pressure from the chamber 76 is ported through a port 82 to a chamber 84. This forces the power piston 30 to separate from the valve body assembly and apply the brakes by exerting a force on the piston 38 of a standard hydraulic master cylinder 28 through the drive pin 34. The air pressure in the chamber 84 also assures that the valve body assembly will be held back against a snap ring 86. The only pedal movement then will be that required to operate the air valves as described.

Figure 2:
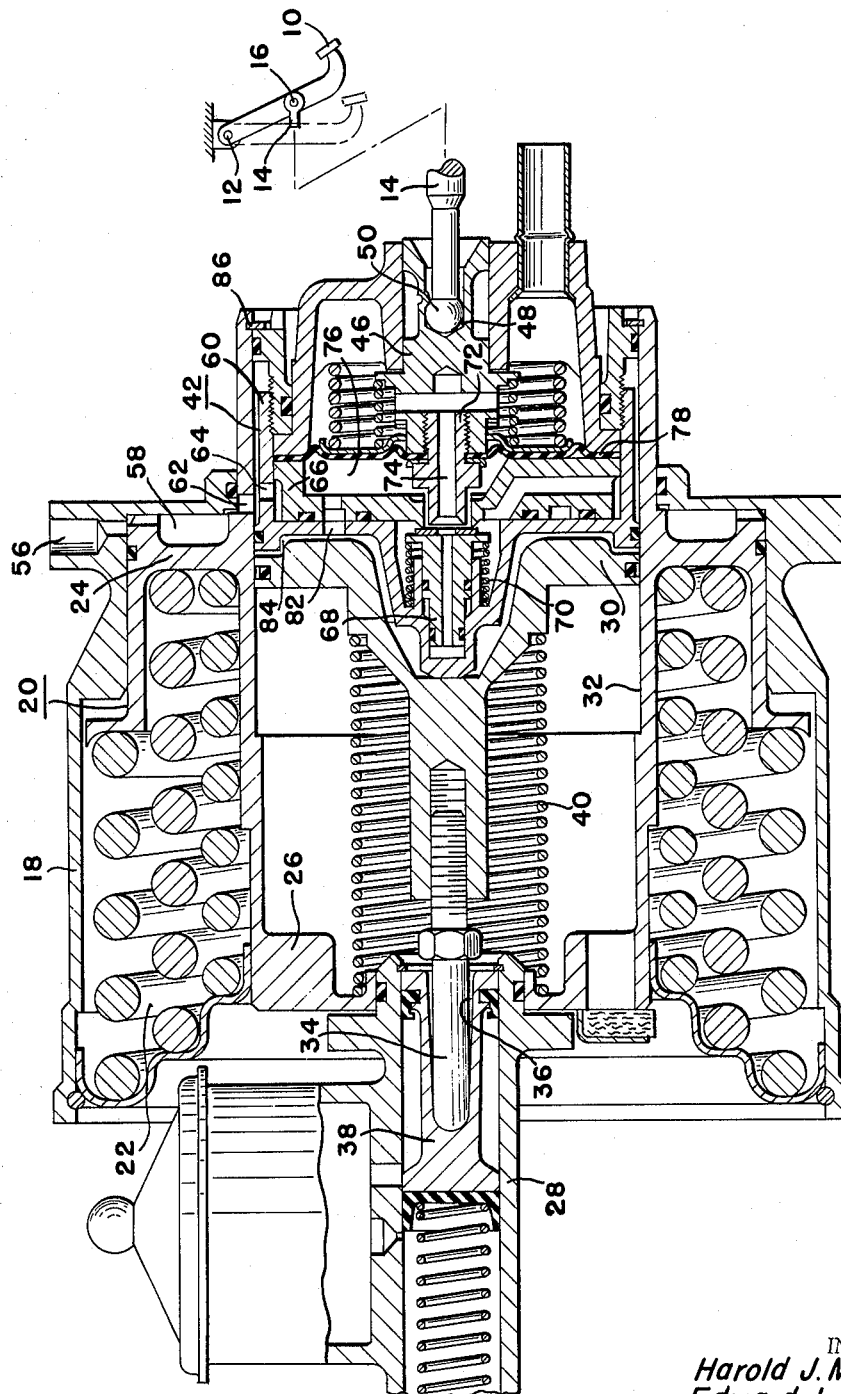
FIGURE 2 is a sectional view of a power braking unit constructed according to the present invention in which the configuration that the power system would assume during unpowered operation is illustrated.

Referring now to FIGURE 2, when there is insufficient pressure in the chamber 58 to overcome the biasing force of the spring pack 22, the entire power cylinder 26 is forced rightwardly as viewed in FIGURE 2 and, consequently, the pedal 10 is carried rightwardly also and, through the engagement of the push rod 14, is caused to pivot around the point 12 to a high position. Under these conditions, the pedal is positioned so as to offer a greater mechanical advantage to actuation of the braking system. It should be noted that, with no pressure available from the source 44, a mechanical force transmitting means is established between the push rod 14 and the piston 38 by the power output control means 42 bottoming against the force side of the power piston 30. Therefore, any pedal movement will move the piston 38 and cause an unpowered actuation of the brakes.

It is an important feature of the present invention that, if pressure to the power unit diminishes, the effectiveness of the braking is not impaired because the spring pack 22 will constantly bias the power cylinder and the power components it contains in the direction of the brake pedal, thereby raising the brake pedal to a higher position than it had with any amount of higher pressure from the pressure source. It therefore becomes apparent that the transition between power with a low pedal contion and unpowered operation with a high pedal is accomplished through an infinite number of intermediate stages with no loss in brake capacity during the transition. This is brought about primarily through the expedient of an increasing mechanical advantage of the pedal to provide better leverage as well as allowing a greater amount of pedal travel for unpowered operation.

While the embodiment of the present invention, as herein disclosed, constitutes a preferred form, it is to be understood that other forms might be adopted.

What is claimed is as follows:

1. A brake pedal height control device for a vehicle braking system comprising; a pressure source, a housing having a pressure inlet from said pressure source, piston means biased towards one side of said housing, a power output control means carried for sliding movement by said piston means in contact therewith, power output means responsive to said control means and adapted to energize said vehicle braking system, and an actuator means including a pivotally mounted pedal therefor having a portion engaging said power output control means, said piston means being responsive to pressure changes from said pressure source to move said power output control means and the engaging pedal portion into a plurality of positions relative to said housing whereby the pedal is moved on its pivotal axis to provide a mechanical advantage directly proportional to pressure availability for operation under varying pressure conditions.

2. A brake pedal height control device for a vehicle power braking system comprising; piston means responsive to pressure, power output control means carried for sliding movement within said piston means in contact therewith, power means responsive to said power output control means and adapted to energize said vehicle power braking system, a fluid pressure source arranged to provide fluid pressure power for operation of the vehicle power braking system, and actuator means including a pendantly supported and pivotally mounted pedal arranged to cooperate with said power output control means to energize the power braking system, said power output control means and said power means being arranged to provide force transmitting means between said pedal and the power braking system during periods of unpowered operation, said piston means driving said power output control means and said pedal to a plurality of positions intermediate the extremes of movement of said power output control means thereby providing a varying pedal level for partially powered and unpowered operation of the power braking system in response to a change in pressure of said pressure source.

3. A brake pedal height control device for vehicle power brakes comprising; a servomotor responsive to a fluid pressure, power output means carried by said servomotor and arranged to move with said servomotor, a hydraulic master cylinder disposed in operative association with said power output means, power output control means carried by said servomotor and arranged to meter fluid pressure to said power output means, actuator means including a brake pedal pivotally mounted and supported for pendulum movement and being in driving engagement with said power output control means, and a fluid pressure source being in fluid communication with said servomotor, said power output means and said power output control means and said servomotor moving linearly in response to a change in pressure from said pressure source thereby moving said pedal in a pendulum fashion on its pivotal mounting, said pedal movement causing said pedal to offer a varying mechanical advantage for actuating said power brakes as the available pressure for power brake operation varies.

4. A brake pedal height control device for a vehicle power braking system comprising; a pressure source for said power braking system, a fixed housing being in fluid communication with said pressure source, a servomotor biased towards one portion of said housing and being disposed in sliding relationship to said housing, power output means including control means therefor being carried for sliding movement by said servomotor, a hydraulic master cylinder being carried by said servomotor and being operatively associated with the vehicle brakes through said power braking system, and actuating means including a pendantly supported and pivotally mounted pedal being in driving engagement with said power output control means, said servomotor being responsive to a change in pressure from said pressure source to move said power output means and said hydraulic master cylinder to a plurality of positions relative to said fixed housing, said movement of the power output means carrying said pedal to a plurality of positions relative to said fixed housing thereby providing said pedal with a varying mechanical advantage for driving said power output means as pressure for said power braking system varies.

5. A vehicle air pressure actuated power brake assembly comprising; an air pressure source, pedal level control means including a movable portion and a stationary portion in fluid communication with said air pressure source and being responsive to said air pressure for pedal level positioning, air valve means for metering air pressure in the power brake assembly, power piston means arranged to cooperate with an hydraulic master cylinder for brake actuation, and actuating means including a brake pedal therefor cooperating with said air valve means, the movable portion of said pedal level control means and said power piston means being pressure responsive and carrying the hydraulic master cylinder, said movable portion adapted for moving to a first position and holding said brake pedal at one extreme position during a period of maximum pressure availability, said pedal level control means movable portion moving to a second position and holding said brake pedal in an opposite extreme position during a period of no pressure availability, said brake pedal control means movable portion moving into other positions and holding said brake pedal at an infinite number of operative positions intermediate the extreme positions during a period of varying pressure availability.

6. Pedal level control means for an air actuated motor vehicle power brake assembly comprising; an air pressure source, piston means responsive to air pressure from said air pressure source, power output control means for regulating air pressure to said assembly in response to an input force, and actuator means including a pivotally supported pedal therefor drivably engaging said power output control means for control thereof, said piston means being arranged to be responsive to a change in air pressure to reposition a portion of said power output control means relative to said piston means to thereby vary the position of the pedal around its pivot while maintaining said assembly in operative condition at an infinite number of points intermediate to extremese of movement while maintaining a power availability proportional to the amount of air pressure change.

7. A brake pedal height control device comprising; a fluid pressure source, piston means being responsive to changes in fluid pressure from said pressure source, power output control means operatively associated with said pressure source for actuating a vehicle brake, and brake actuating means including a pivotally mounted pedal drivably engaging said power output control means, said piston means being adapted to move a portion of said power output control means and said pedal on its pivotal mounting in response to a change in fluid pressure from said pressure source whereby said pedal has a greater mechanical advantage for underpowered operation in an infinite number of positions varying from the lowest pedal position to the highest pedal position.

References Cited by the Examiner

UNITED STATES PATENTS

| 2,836,265 | 5/1958 | Ingres | 60—54.6 X |
| 2,858,911 | 11/1958 | Price | 60—54.5 X |
| 2,910,147 | 10/1959 | Fishtahler et al. | |
| 3,063,427 | 11/1962 | Hill | 60—54.6 X |
| 3,120,156 | 2/1964 | Ayers | 91—391 |
| 3,143,930 | 8/1964 | Ayers | 91—391 |

SAMUEL LEVINE, *Primary Examiner.*

EDGAR W. GEOGHEGAN, JULIUS E. WEST,
            *Examiners.*